United States Patent
Nishio

(10) Patent No.: US 8,380,038 B2
(45) Date of Patent: Feb. 19, 2013

(54) BROADCASTING STATION APPARATUS AND RECORDING/REPRODUCING APPARATUS

(75) Inventor: Toshiroh Nishio, Osaka (JP)

(73) Assignee: Panasonic Corporation, Osaka (JP)

( * ) Notice: Subject to any disclaimer, the term of this patent is extended or adjusted under 35 U.S.C. 154(b) by 785 days.

(21) Appl. No.: 12/520,209

(22) PCT Filed: Dec. 21, 2007

(86) PCT No.: PCT/JP2007/074659
§ 371 (c)(1),
(2), (4) Date: Jun. 19, 2009

(87) PCT Pub. No.: WO2008/084655
PCT Pub. Date: Jul. 17, 2008

(65) Prior Publication Data
US 2009/0310946 A1 Dec. 17, 2009

(30) Foreign Application Priority Data
Dec. 22, 2006 (JP) .................................. 2006-345989

(51) Int. Cl.
H04N 5/765 (2006.01)
H04N 5/931 (2006.01)

(52) U.S. Cl. ......................................... 386/200; 386/204

(58) Field of Classification Search .................. None
See application file for complete search history.

(56) References Cited

U.S. PATENT DOCUMENTS

| 5,485,219 | A | 1/1996 | Woo |
| 7,724,682 | B2 * | 5/2010 | Kovacevic ..................... 370/252 |
| 7,823,174 | B2 * | 10/2010 | Candelore et al. .............. 725/36 |
| 7,860,369 | B2 * | 12/2010 | Takahashi et al. ............. 386/343 |
| 8,023,409 | B2 * | 9/2011 | Nguyen ......................... 370/235 |

(Continued)

FOREIGN PATENT DOCUMENTS

| CN | 1118967 A | 4/2012 |
| EP | 0679026 | 10/1995 |

(Continued)

OTHER PUBLICATIONS

Japan Office action in JP 2006-345989, mail date is Jun. 21, 2011.

(Continued)

*Primary Examiner* — William C Vaughn, Jr.
*Assistant Examiner* — Oluwaseun A Adegeye
(74) *Attorney, Agent, or Firm* — Greenblum & Bernstein, P.L.C.

(57) ABSTRACT

A broadcasting station apparatus includes a video editor and a TS encoder. The video editor produces a video signal by editing video of a TV program and video of a CM. When substantially the same scenes are arranged before and after the CM in the video signal produced in the video editor, the TS encoder manipulates predetermined data of a TS packet storing information of the same scene (overlap scene) after the CM. In a recording/reproducing apparatus, the TS packet storing the information of the overlap scene is sorted based on the data. The TS packet storing the information of the overlap scene is not decoded in time shift reproduction.

13 Claims, 11 Drawing Sheets

U.S. PATENT DOCUMENTS

| | | |
|---|---|---|
| 2002/0037152 A1 | 3/2002 | Kato et al. |
| 2004/0027890 A1 | 2/2004 | Nakanishi et al. |
| 2005/0044561 A1 | 2/2005 | McDonald |
| 2006/0193597 A1 | 8/2006 | Horii et al. |
| 2006/0269222 A1 | 11/2006 | Horii |
| 2006/0280443 A1 | 12/2006 | Horii |
| 2007/0230905 A1 | 10/2007 | Kato et al. |
| 2009/0046994 A1 | 2/2009 | Takesue et al. |
| 2009/0087169 A1 | 4/2009 | Nakanishi et al. |
| 2009/0138934 A1 | 5/2009 | Aoki et al. |

FOREIGN PATENT DOCUMENTS

| | | |
|---|---|---|
| EP | 1193973 | 4/2002 |
| EP | 1422714 | 5/2004 |
| JP | 9-231602 | 9/1997 |
| JP | 2000-57749 | 2/2000 |
| JP | 2000-057749 | 2/2000 |
| JP | 2000-078528 | 3/2000 |
| JP | 2000-78528 | 3/2000 |
| JP | 2006-041914 | 2/2006 |
| JP | 2006-41914 | 2/2006 |
| WO | 00/21290 | 4/2000 |

OTHER PUBLICATIONS

English language Abstract of JP 2000-78528, Mar. 14, 2000.
English language Abstract of JP 2006-41914, Feb. 9, 2006.
English language Abstract of JP 2000-57749, Feb. 25, 2000.
English language Abstract of JP 9-231602, Sep. 5, 1997.

* cited by examiner

F I G. 5

| DATA STRUCTURE | | BIT COUNT |
|---|---|---|
| Header | sync_byte | 8 |
| | transport_error_indicator | 1 |
| | payload_unit_start_indicator | 1 |
| | transport_priority | 1 |
| | PID(packet identifier) | 13 |
| | transport_scrambling_control | 2 |
| | adaptation_field_control | 2 |
| | continuity_counter | 4 |
| Data | adaptation_field() | 8×N |
| | data_byte() | 8×N |

F I G. 6

| DATA STRUCTURE | | BIT COUNT |
|---|---|---|
| adaptation_field_length | | 8 |
| discontinuity_indicator | | 1 |
| random_access_indicator | | 1 |
| elementary_stream_priority_indicator | | 1 |
| PCR_flag | | 1 |
| OPCR_flag | | 1 |
| splicing_point_flag | | 1 |
| transport_private_data_flag | | 1 |
| adaptation_field_extention_flag | | 1 |
| PCR field | program_clock_reference_base | 33 |
| | reserved | 6 |
| | program_clock_reference_extention | 9 |
| OPCR field | original_program_clock_reference_base | 33 |
| | reserved | 6 |
| | original_program_clock_reference_extention | 9 |
| splice_countdown field | splice_countdown | 8 |
| transport_private_data field | transport_private_data_length | 8 |
| | private_data_byte | 8×N |
| adaptation_field_extention field | adaptation_field_extention_length | 8 |
| | ltw_flag | 1 |
| | piecewise_rate_flag | 1 |
| | seamless_splice_flag | 1 |
| | ltw_valid_flag | 1 |
| | ltw_offset | 15 |
| | reserved | 2 |
| | piecewise_rate | 22 |
| | splice_type | 4 |
| | DTS_next_au | 36 |
| stuffing_bytes | | 8×N |

FIG. 8

| Syntax | BIT COUNT | Mnemonic |
|---|---|---|
| transport_packet(){ | | |
|     sync_byte | 8 | bslbf |
|     transport_error_indicator | 1 | bslbf |
|     payload_unit_start_indicator | 1 | bslbf |
|     transport_priority | 1 | bslbf |
|     PID | 13 | uimsbf |
|     transport_scrambling_control | 2 | bslbf |
|     adaptation_field_control | 2 | bslbf |
|     continuity_counter | 4 | uimsbf |
|     if(adaptation_field_control=='10' \|\| adaptation_field_control=='11'){ | | |
|         adaptation_field() | | |
|     } | | |
|     if(adaptation_field_control=='01' \|\| adaptation_field_control=='11') { | | |
|         for (i=0;i<N;i++){ | | |
|             data_byte | 8 | bslbf |
|         } | | |
|     } | | |
| } | | |

FIG. 9

| Syntax | BIT COUNT | Mnemonic |
|---|---|---|
| adaptation_field() { | | |
|    adaptation_field_length | 8 | uimsbf |
|    if(adaptation_field_length >0) { | | |
|       discontinuity_indicator | 1 | bslbf |
|       random_access_indicator | 1 | bslbf |
|       elementary_stream_priority_indicator | 1 | bslbf |
|       PCR_flag | 1 | bslbf |
|       OPCR_flag | 1 | bslbf |
|       splicing_point_flag | 1 | bslbf |
|       transport_private_data_flag | 1 | bslbf |
|       adaptation_field_extension_flag | 1 | bslbf |
|       if(PCR_flag == '1') { | | |
|          · · · · OMISSION · · · · | | |
|       if(transport_private_data_flag == '1') { | | |
|          transport_private_data_length | 8 | uimsbf |
|          for (i=0; i<transport_private_data_length;i++){ | | |
|             private_data_byte | 8 | bslbf |
|          } | | |
|       } | | |
|       · · · · OMISSION · · · · | | |
|       for (i=0;i<N;i++){ | | |
|          stuffing_byte | 8 | bslbf |
|       } | | |
|    } | | |
| } | | |

C { private_data_byte

F I G. 1 0
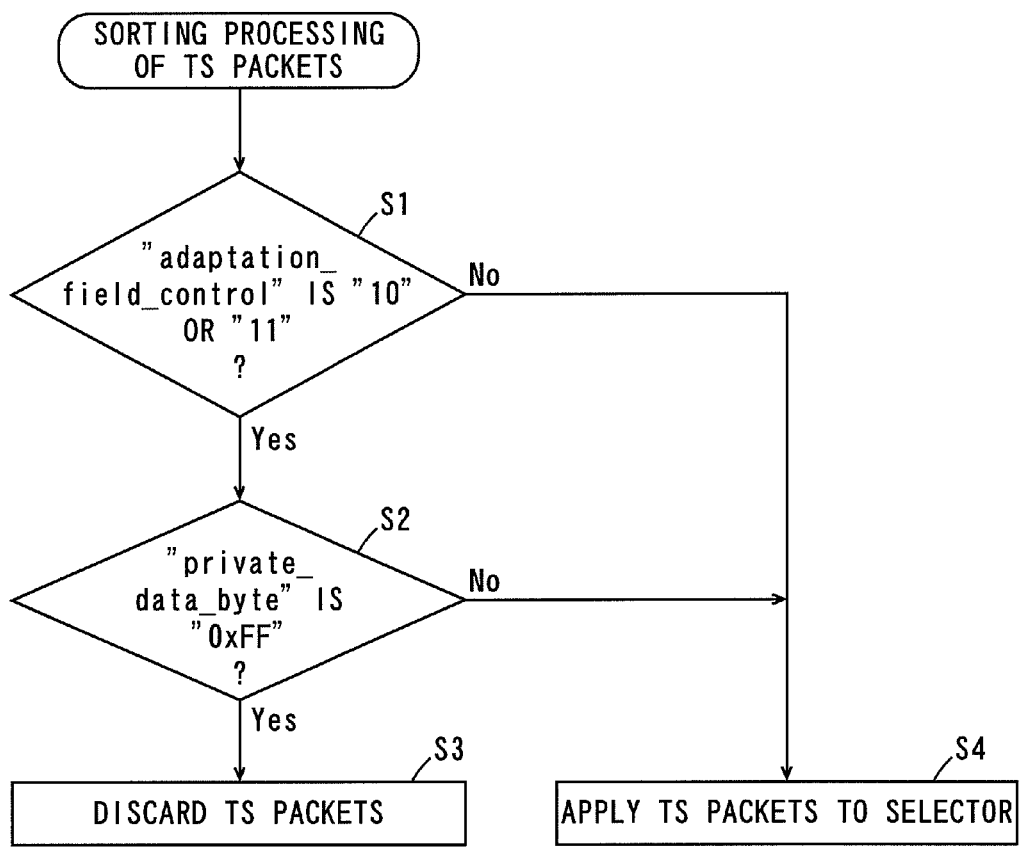

BROADCASTING STATION APPARATUS AND RECORDING/REPRODUCING APPARATUS

TECHNICAL FIELD

The present invention relates to a broadcasting station apparatus that transmits television broadcast signals and a recording/reproducing apparatus that records and reproduces the television broadcast signals.

BACKGROUND ART

When a viewer cannot view a television (hereinafter abbreviated as TV) broadcast in real time, he or she records the TV broadcast in a recording medium such as a DVD (Digital Versatile Disk) or an HD (Hard Disk) using a recording/reproducing apparatus (Patent Document 1, for example).

When reproducing the recording medium, the viewer uses a fast-forward function or the like of the recording/reproducing apparatus, thereby viewing only desired scenes. Accordingly, the viewer can efficiently view the TV broadcast.

The recording/reproducing apparatus having a function of automatically fast-forwarding commercial messages (hereinafter abbreviated as CMs) has been conventionally developed. The foregoing function is hereinafter referred to as a CM skip function. According to such a recording/reproducing apparatus, the viewer can view only TV programs without operations such as fast-forwarding when reproducing the record medium. Thus, the viewer can more efficiently view the TV broadcast.

[Patent Document 1] JP 9-231602 A

DISCLOSURE OF THE INVENTION

Problems to be Solved by the Invention

Recent TV broadcast frequently employs a technique in which a TV program scene that has been broadcasted immediately before a CM is again broadcasted immediately after the CM. This easily reminds a viewer of contents of the TV program that has been broadcasted before the CM even though the CM interrupted the TV program. Accordingly, broadcast stations can broadcast CMs without lessening the viewer's interest in the TV program.

When the recording medium in which such a TV broadcast is recorded is reproduced using the foregoing CM skip function, however, same scenes are sequentially reproduced. In this case, the viewer sequentially views same scenes, thus being bothered.

An object of the present invention is to provide a broadcasting station apparatus and a recording/reproducing apparatus that allow comfortable viewing of TV broadcast.

Means for Solving the Problems (1) According to an aspect of the present invention, a broadcasting station apparatus that produces a television broadcast signal includes an editor that edits information of a television program and information of a commercial message to produce an edit signal for television broadcasting, an encoder that encodes the edit signal produced by the editor to produce an encoded signal, a packet producer that packetizes the encoded signal produced by the encoder, and a first data manipulator that manipulates predetermined data of a packet storing the information of the television program of a given period after the information of the commercial message out of packets produced by the packet producer when the information of the television program of the given period is substantially the same as the information of the television program before the information of the commercial message in the edit signal produced by the editor.

In the broadcasting station apparatus, the edit signal in which the information of the television program and the information of the commercial message are edited is produced by the editor, and the encoded signal is produced by the encoder based on the edit signal. The encoded signal produced in the encoder is packetized by the packet producer.

Here, when the information of the television program of the given period after the information of the commercial message is substantially the same as the information of the television program before the information of the commercial message in the edit signal produced by the editor, the predetermined data of the packet storing the information of the television program of the given period out of the packets produced by the packet producer is manipulated by the first data manipulator.

In this case, when a broadcasting station broadcasts scenes of substantially the same contents of the television program before and after the commercial message, the data of the packet storing the information of the scene of substantially the same contents to be broadcasted after the commercial message (hereinafter referred to as an overlap scene) is manipulated. Thus, the packet in which the information of the overlap scene is stored can be sorted based on the data manipulated by the first data manipulator in a recording/reproducing apparatus that records and reproduces the television broadcast signal produced by the broadcasting station apparatus.

Accordingly, when the television broadcast signal is recorded in the recording medium and the recorded television broadcast signal is reproduced later (hereinafter referred to as time-shift reproduction) in the recording/reproducing apparatus, reproduction of the packet in which the information of the overlap scene is stored can be prevented. In this case, a viewer can view the television broadcast from which the overlap scene is deleted. This allows comfortable viewing of the television broadcast.

(2) The information of the television program may include video information of the television program, the information of the commercial message may include video information of the commercial message, the edit signal may include a video signal in which the video information of the television program and the video information of the commercial message are edited, the encoder may include an elementary stream producer that produces an elementary stream of the video signal, and the elementary stream producer may complete GOP at an ending point of the commercial message and an ending point of the given period.

In this case, degradation of video of the commercial message immediately before the overlap scene and the television program immediately after the overlap scene caused at the time of deleting the overlap scene from the television broadcast signal can be prevented in the recording/reproducing apparatus.

(3) The packet producer may include a transport stream packet producer that produces a transport stream packet, and the predetermined data may be "private_data_byte".

In this case, the transport packet storing the information of the overlap scene can be sorted based on "private_data_byte". Thus, the overlap scene can be easily deleted in the recording/reproducing apparatus.

(4) A value of the "private_data_byte" may be determined depending on a level of importance of a scene of the given period after the commercial message.

In this case, the television broadcast as intended by the broadcasting station can be provided to the viewer also in the time shift reproduction in the recording/reproducing apparatus. In addition, the viewer can selectively delete the overlap scene based on the value of "private_data_byte". This allows the viewer to more comfortably view the television broadcast.

(5) The packet producer may include a transport stream packet producer that produces a transport stream packet, and the predetermined data may be "transport_private_data_flag".

In this case, the transport packet storing the information of the overlap scene can be sorted based on "transport_private_data_flag". This allows the overlap scene to be easily deleted in the recording/reproducing apparatus. Moreover, "transport_private_data_flag" is data of one bit, thus facilitating the data manipulation in the broadcasting station apparatus.

(6) The packet producer may include a transport stream packet producer that produces a transport stream packet, and the predetermined data may be "transport_priority".

"transport_priority" is data stored in a header of the transport stream packet. This allows the transport stream packet in which the overlap scene is stored to be easily sorted in the recording/reproducing apparatus.

(7) The packet producer may include a packetized elementary stream producer that produces a packetized elementary stream, and the predetermined data may be "PES_priority".

In this case, the packetized elementary stream packet storing the information of the overlap scene can be sorted based on "PES_priority". This allows the overlap scene to be easily deleted in the recording/reproducing apparatus.

(8) The packet producer may include a packetized elementary stream producer that produces a packetized elementary stream, and the predetermined data may be "PES_private_data".

In this case, the packetized elementary stream packet storing the information of the overlap scene can be sorted based on "PES_private_data". This allows the overlap scene to be easily deleted in the recording/reproducing apparatus.

(9) According to another aspect of the present invention, a recording/reproducing apparatus that records and reproduces a television broadcast signal produced by a broadcasting station apparatus, wherein the television broadcast signal includes predetermined data previously manipulated in a predetermined method in a packet storing information of a television program of a given period after information of a commercial message when the information of the television program of the given period is substantially the same as the information of the television program before the information of the commercial message, the recording/reproducing apparatus includes a writer that writes the television broadcast signal produced by the broadcasting station apparatus in a form of packets in a recording medium, a reader that reads the packets recorded in the recording medium, a first decoder that decodes the encoded signal from the packets read by the reader, and a first sorter that sorts the packets of the television broadcast signal into the packet storing the information of the given period and other packets based on the predetermined data, wherein the first decoder does not decode the encoded signal from the packet storing the information of the given period sorted by the first sorter.

In the recording/reproducing apparatus, the television broadcast signal is written in the form of packets in the recording medium by the writer. The packets recorded in the recording medium are read by the reader. The packets read by the reader are sorted into the packet storing the information of the overlap scene and the other packets by the first sorter based on the predetermined data manipulated in the broadcasting station apparatus.

Here, the first decoder does not decode the encoded signal from the packet storing the information of the overlap scene sorted by the first sorter, but decodes the encoded signal from the other packets.

In this case, the information of the overlap scene is deleted in the encoded signal decoded by the first decoder. Accordingly, the viewer can view the television broadcast from which the overlap scene is deleted. This allows comfortable viewing of the television broadcast.

(10) The writer may write the television broadcast signal produced by the broadcasting station apparatus in a form of transport stream packets in the recording medium, the first decoder may decode the encoded signal from the transport stream packets read by the reader, the first sorter may sort the transport stream packets of the television broadcast signal into a transport stream packet storing the information of the given period and other transport stream packets based on the predetermined data, and the first decoder may not decode the encoded signal from the transport stream packet storing the information of the given period sorted by the first sorter.

In the recording/reproducing apparatus, the television broadcast signal is written in the form of transport stream packets in the recording medium by the writer. The transport stream packets recorded in the recording medium are read by the reader. The transport stream packets read by the reader are sorted into the transport stream packet storing the information of the overlap scene and the other transport stream packets by the first sorter based on the predetermined data manipulated in the broadcasting station apparatus.

Here, the first decoder does not decode the encoded signal from the transport stream packet storing the information of the overlap scene sorted by the first sorter, but decodes the encoded signal from the other transport stream packets.

In this case, the information of the overlap scene is deleted in the encoded signal decoded by the first decoder. Accordingly, the viewer can view the television broadcast from which the overlap scene is deleted. This allows comfortable viewing of the television broadcast.

(11) The reader may discard the packet storing the information of the given period sorted by the first sorter. In this case, the overlap scene can be reliably removed at the time of time shift reproduction of the television broadcast signal.

(12) The writer may not write the packet storing the information of the given period sorted by the first sorter in the recoding medium. In this case, the overlap scene can be reliably removed at the time of time shift reproduction of the television broadcast signal.

(13) According to still another aspect of the present invention, a recording/reproducing apparatus records and reproduces a television broadcast signal produced by a broadcasting station apparatus, wherein the television broadcast signal includes data previously manipulated in a predetermined method in a packetized elementary stream packet storing information of a television program of a given period after information of a commercial message when the information of the television program of the given period is substantially the same as the information of the television program before the information of the commercial message, the recording/reproducing apparatus includes a writer that writes the television broadcast signal produced by the broadcasting station apparatus in a form of transport stream packets in a recording medium, a reader that reads the transport stream packets recorded in the recording medium, a second decoder that decodes packetized elementary stream packets from the transport stream packets read by the reader, a third decoder that decodes an elementary stream from the packetized elementary stream packets decoded by the second decoder, and a second sorter that sorts the packetized elementary stream packets decoded by the second decoder into the packetized elementary stream packet storing the information of the given period and other packetized elementary stream packets based on the predetermined data, wherein the third decoder does not decode the elementary stream from the packetized elementary stream packet storing the information of the given period sorted by the second sorter.

In the recording/reproducing apparatus, the television broadcast signal is written in the form of transport stream packets in the recording medium by the writer. The transport stream packets recorded in the recording medium are read by the reader. The second decoder decodes the packetized elementary stream packets from the transport stream packets read by the reader. The packetized elementary stream packets decoded by the second decoder are sorted into the packetized elementary stream packet storing the information of the overlap scene and the other packetized elementary stream packets by the second sorter based on the predetermined data manipulated in the broadcasting station apparatus.

Here, the third decoder does not decode the elementary stream from the packetized elementary stream packet storing the information of the overlap scene sorted by the second sorter, but decodes the elementary stream from the other packetized elementary stream packets.

In this case, the information of the overlap scene is deleted in the edit signal decoded from the elementary stream decoded by the second decoder. Accordingly, the viewer can view the television broadcast from which the overlap scene is deleted. This allows comfortable viewing of the television broadcast.

(14) According to yet another aspect of the present invention, a recording/reproducing apparatus that records and reproduces a television broadcast signal includes a writer that writes the television broadcast signal in a form of packets in a recording medium, a reader that reads the packets recorded in the recording medium, a fourth decoder that decodes a video signal in which video information of a television program and video information of a commercial message are edited from the packets read by the reader, and a second data manipulator that manipulates predetermined data of a packet storing the video information of the television program of a given period after the video information of the commercial message out of the packets recorded in the recording medium when the video information of the television program of the given period is substantially the same as the video information of the television program before the video information of the commercial message in the video signal decoded by the fourth decoder, wherein at the time of reproduction of the recording medium, the fourth decoder does not decode the video signal from the packet subjected to data manipulation by the second data manipulator.

In the recording/reproducing apparatus, the television broadcast signal is written in the form of packets in the recording medium by the writer. The packets recorded in the recording medium are read by the reader. The packets read by the reader are decoded by the fourth decoder into the video signal in which the video information of the television program and the video information of the commercial message are edited.

Here, when the video information of the television program of the given period after the video information of the commercial message is substantially the same as the video information of the television program before the video information of the commercial message in the video signal decoded by the fourth decoder, the predetermined data of the packet storing the video information of the television program of the given period out of the packets recorded in the recording medium is manipulated by the second data manipulator.

In reproduction of the recording medium, the fourth decoder does not decode the video signal from the packet subjected to the data manipulation by the second data manipulator, but decodes the video signal from the other packets.

In this case, the overlap scene is deleted in the video signal decoded by the fourth decoder. Accordingly, the viewer can view the television broadcast from which the overlap scene is deleted. This allows comfortable viewing of the television broadcast.

(15) The recording/reproducing apparatus further includes a fifth decoder that decodes an audio signal in which audio information of the television program and audio information of the commercial message are edited from the packets read by the reader, wherein the second data manipulator may manipulate predetermined data of a packet storing the video information and the audio information of the television program of the given period after the video information of the commercial message out of the packets recorded in the recording medium when the video information of the television program of the given period is substantially the same as the video information of the television program before the video information of the commercial message in the video signal decoded by the fourth decoder, and at the time of reproduction of the recording medium, the fourth and fifth decoders may not decode the video signal and the audio signal from the packet subjected to data manipulation by the second data manipulator.

In the recording/reproducing apparatus, the television broadcast signal is written in the form of packets in the recording medium by the writer. The packets recorded in the recording medium are read by the reader. The packets read by the reader are decoded by the fourth decoder into the video signal in which the video information of the television program and the video information of the commercial message are edited.

Here, when the video information of the television program of the given period after the video information of the commercial message is substantially the same as the video information of the television program before the video information of the commercial message in the video signal decoded by the fourth decoder, the predetermined data of the packet storing the video information and the audio information of the television program of the given period out of the packets recorded in the recording medium is manipulated by the second data manipulator.

In reproduction of the recording medium, the fourth and fifth decoders do not decode the video signal and the audio signal from the packet subjected to the data manipulation by the second data manipulator, but decodes the video signal and the audio signal from the other packets.

In this case, the overlap scene is deleted in the video signal and the audio signal decoded by the fourth and fifth decoders. Accordingly, the viewer can view the television broadcast from which the overlap scene is deleted. This allows comfortable viewing of the television broadcast.

Effects of the Invention

According to the present invention, predetermined data of a packet in which information of a commercial message is stored out of packets storing information of a television broadcast is manipulated. When a television broadcast signal recoded in a recording medium is subjected to time shift reproduction in a recording/reproducing apparatus, the signal is not decoded from the packet whose predetermined data has been manipulated.

In this case, information of an overlap scene is deleted from the television broadcast signal in the time shift reproduction. Accordingly, a viewer can view the television broadcast from which the overlap scene is deleted. This allows comfortable viewing of the television broadcast.

BRIEF DESCRIPTION OF THE DRAWINGS

FIG. 5 is a diagram showing the data structure of a TS packet.

FIG. 6 is a diagram showing the data structure of "adaptation_field".

FIG. 8 is a diagram showing Syntax of the TS packet.

FIG. 9 is a diagram showing Syntax of "adaptation_field".

FIG. 10 is a flowchart showing sorting processing of the TS packets by the recorder/reproducer.

BEST MODE FOR CARRYING OUT THE INVENTION

Figure 1:
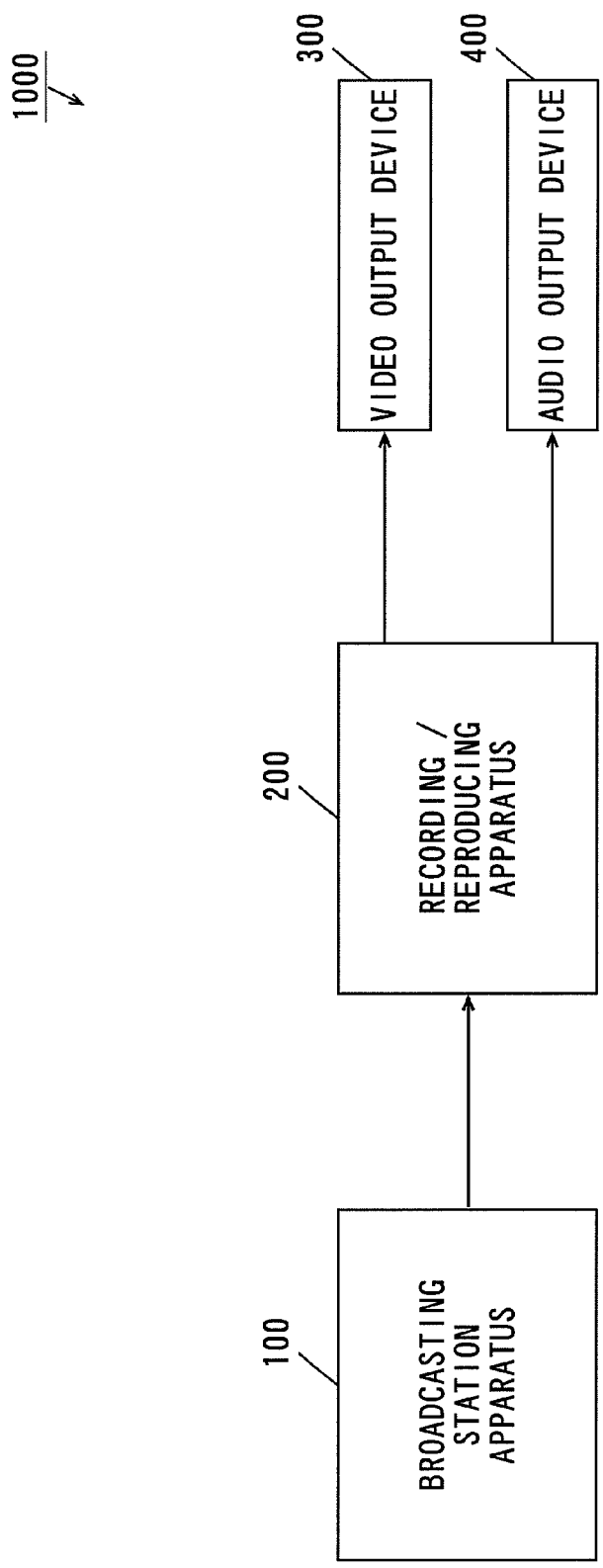
FIG. 1 is a schematic structural view showing a transmitting/receiving system including a broadcasting station apparatus and a recording/reproducing apparatus according to a first embodiment.

Description will be made of a transmitting/receiving system including a broadcasting station apparatus and a recording/reproducing apparatus according to embodiments of the present invention while referring to the drawings.

(A) First Embodiment (1) Structure of Transmitting/Receiving System

FIG. 1 is a schematic structural view showing a transmitting/receiving system including a broadcasting station apparatus and a recording/reproducing apparatus according to a first embodiment of the present invention.

As shown in FIG. 1, the transmitting/receiving system 1000 according to the present embodiment includes the broadcasting station apparatus 100, the recording/reproducing apparatus 200, a video output device 300 and an audio output device 400.

The broadcasting station apparatus 100 transmits a television broadcast signal (hereinafter abbreviated as a TV broadcast signal) that is compression-encoded in an MPEG (Motion Picture Experts Group)-2 system. The recording/reproducing apparatus 200 receives the TV broadcast signal transmitted from the broadcasting station apparatus 100, and extracts a video signal and an audio signal from the TV broadcast signal. Details of the broadcasting station apparatus 100 and the recording/reproducing apparatus 200 will be described later.

The video output device 300 includes a liquid crystal display panel, a plasma display panel or the like, for example. The video output device 300 displays video based on the video signal extracted by the recording/reproducing apparatus 200. The audio output device 400 includes a speaker or the like, for example. The audio output device 400 outputs audio based on the audio signal extracted by the recording/reproducing apparatus 200.

(2) Processing of the Transmitting/Receiving System

Next, brief description is made of the TV broadcast signal transmitted/received in the transmitting/receiving system 1000.

Figure 2:
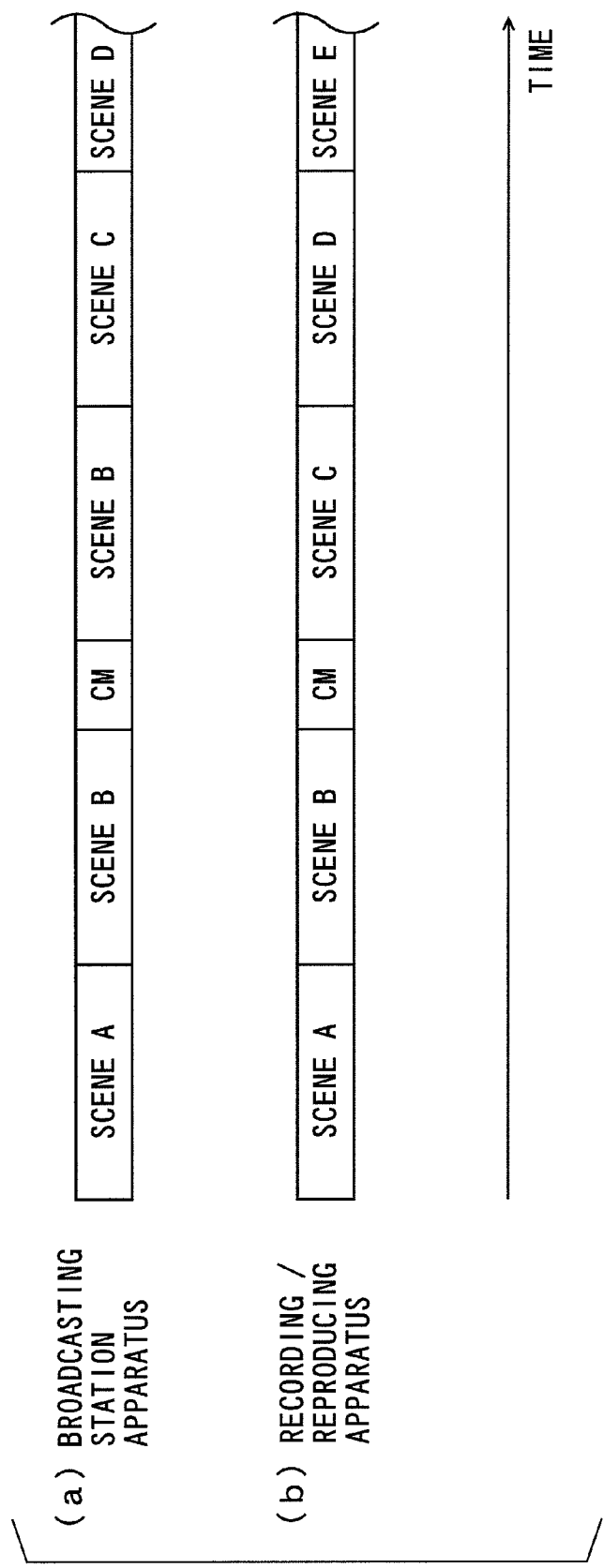
FIG. 2 is a diagram showing a relationship between a TV broadcast signal produced in the broadcasting station apparatus and a TV broadcast signal output from the recording/reproducing apparatus.

FIG. 2 is a diagram showing a relationship between the TV broadcast signal produced in the broadcasting station apparatus 100 and the TV broadcast signal output from the recording/reproducing apparatus 200. In FIG. 2, (a) shows an example of the TV broadcast signal produced in the broadcasting station apparatus 100, and (b) shows an example of the TV broadcast signal output from the recording/reproducing apparatus 200 in the case of reproduction of the TV broadcast signal recorded in the recording/reproducing apparatus 200.

Note that scenes A to E represent scenes of a television program (hereinafter abbreviated as a TV program). In the following description, when the TV broadcast signal is recorded and then reproduced later, it is referred to as time shift reproduction.

As shown in FIG. 2 (a), the TV broadcast signal with data of the same scenes B arranged before and after data of a commercial message (hereinafter abbreviated as a CM) is produced in the broadcasting station apparatus 100.

When a TV broadcast is viewed in real time, the recording/reproducing apparatus 200 applies to the video output device 300 and the audio output device 400 the video signal and the audio signal based on the TV broadcast signal of FIG. 2 (a) transmitted from the broadcasting station apparatus 100. Thus, the viewer can view the same scenes B in predetermined periods before and after the CM. This easily reminds the viewer of contents of the TV program broadcasted before the CM even when the CM interrupted the TV program. As a result, the viewer's interest in the TV program can be prevented from lessening.

Meanwhile, in the case of performing the time shift reproduction, the recording/reproducing apparatus 200 edits the TV broadcast signal of FIG. 2 (a) as shown in FIG. 2 (b). That is, the scene B arranged after the CM is deleted in the time shift reproduction. Therefore, the viewer does not view the scene B twice with the CM interposed therebetween in the time shift reproduction. This allows the viewer to efficiently view the TV program.

Note that the scene, which is the same as the scene before the CM, arranged after the CM (the scene B after the CM in FIG. 2 (a)) is referred to as an overlap scene in the following description.

Hereinafter, description is made of the structures of the broadcasting station apparatus 100 and the recording/reproducing apparatus 200 for performing the foregoing processing while referring to the respective drawings.

(3) The Broadcasting Station Apparatus

First, description is made of the broadcasting station apparatus 100 (FIG. 1).

(3-1) Structure

Figure 3:
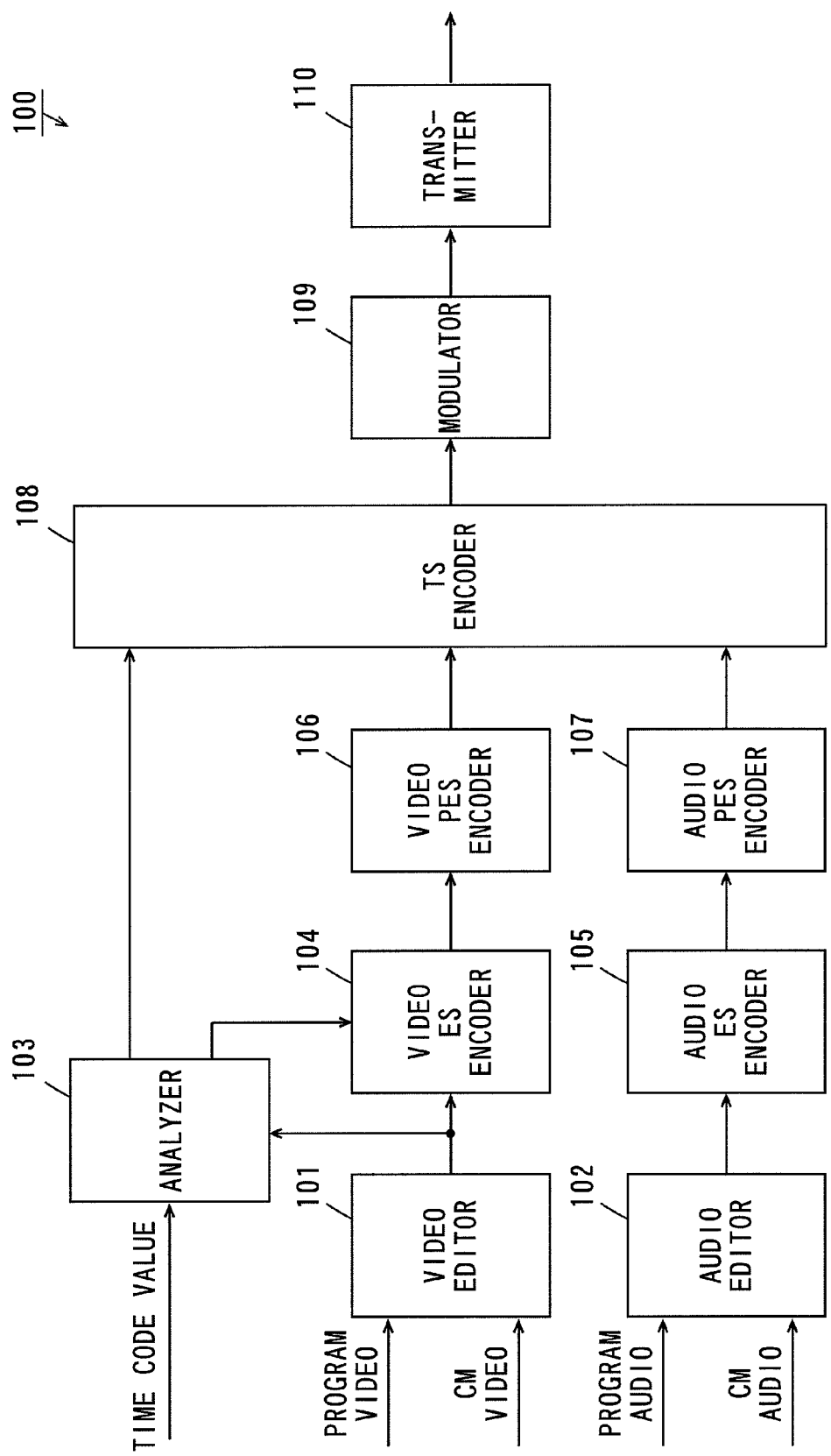
FIG. 3 is a block diagram showing a schematic structure of the broadcasting station apparatus.
Figure 4:
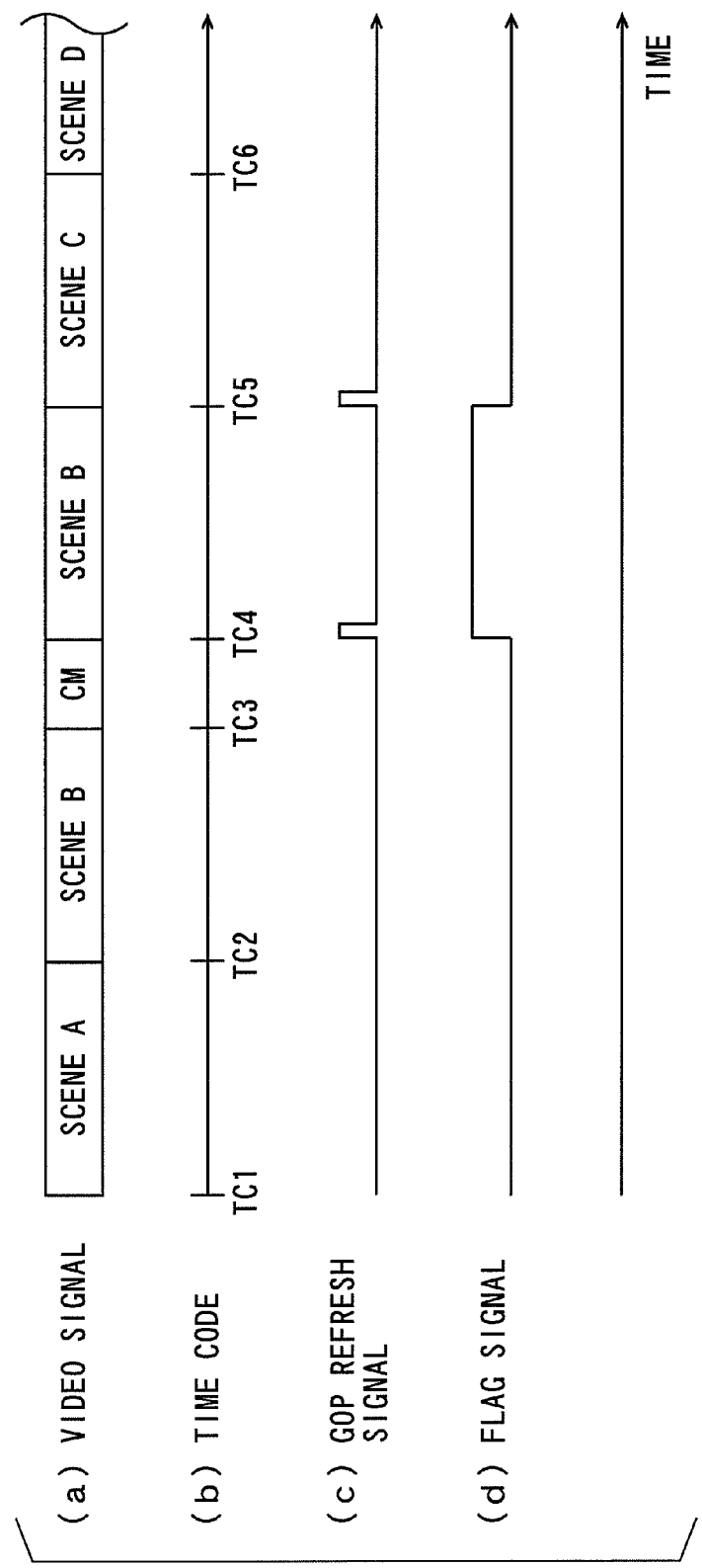
FIG. 4 is a diagram showing respective examples of a video signal, a time code, a GOP refresh signal and a flag signal produced in the broadcasting station apparatus.

FIG. 3 is a block diagram showing the schematic structure of the broadcasting station apparatus 100. FIG. 4 is a diagram showing respective examples of a video signal, a time code, a GOP refresh signal and a flag signal produced in the broadcasting station apparatus 100. Note that scenes A to D represent scenes of the TV program in FIG. 4 (*a*). The time code, the GOP refresh signal and the flag signal will be described later.

As shown in FIG. 3, the broadcasting station apparatus 100 includes a video editor 101, an audio editor 102, an analyzer 103, a video ES encoder 104, an audio ES encoder 105, a video PES encoder 106, an audio PES encoder 107, a TS encoder 108, a modulator 109 and a transmitter 110.

The video editor 101 edits video of the TV program and video of the CM to produce the video signal. In the video signal shown in FIG. 4 (*a*), the respective data of the same scene B are arranged before and after the data of the CM. In this case, the scene B arranged after the CM is the overlap scene. The video editor 101 applies the produced video signal to the video ES encoder 104.

Note that time codes are given to the video signal by the video editor 101. In FIG. 4 (*b*), time code values at starting points (switching points) of the respective scenes and the CM are indicated as TC1 to TC6.

The time code values indicating the starting point and an ending point of the overlap scene are input to the analyzer 103. Note that the time code values are input to the analyzer 103 by an engineer of a broadcasting station, for example. In the example of FIG. 4, the time code values TC4 and TC5 indicating the starting point and the ending point of the overlap scene B are input to the analyzer 103.

The analyzer 103 reads the time code values of the video signal, and then applies the GOP refresh signal to the video ES encoder 104 and the flag signal to the TS encoder 108 based on the read time code values and the input time code values.

Specifically, the GOP refresh signal is set so as to rise in a pulse shape at the time code values TC4 and TC5 input to the analyzer 103 as shown in FIG. 4. That is, the GOP refresh signal rises in the pulse shape at the starting point and the ending point of the overlap scene. Details of the GOP refresh signal will be described later.

The flag signal is set to be at a high level between the two time code values TC4 and TC5 input to the analyzer 103 as shown in FIG. 4. That is, the flag signal is at a high level in a period of the overlap scene. Details of the flag signal will be described later.

The video ES encoder 104 encodes the video signal to produce an elementary stream of the video (hereinafter referred to as a video elementary stream), and applies the produced video ES to the video PES encoder 106.

Note that the video ES encoder 104 completes a GOP (Group of Pictures) in synchronization with the rise of the GOP refresh signal when producing the video ES. In the example of FIG. 4, the video ES encoder 104 completes the GOP at the ending points of the CM and the overlap scene B. This prevents degradation of the video of the CM and the TV program when the overlap scene is deleted by a recorder/reproducer 204, which will be described later.

The video PES encoder 106 packetizes the video ES to produce a packetized elementary stream of the video (hereinafter referred to as a video PES), and applies the produced video PES to the TS encoder 108. Note that the video ES of one frame (picture), for example, is stored in each video PES.

The audio editor 102 (FIG. 3) edits the audio of the TV program and the audio of the CM to produce the audio signal. The audio editor 102 applies the produced audio signal to the audio ES encoder 105. Note that time codes are also given to the audio signal by the audio editor 102 similarly to the video signal.

The audio ES encoder 105 encodes the audio signal to produce an elementary stream of the audio (hereinafter referred to as an audio ES), and applies the produced audio ES to the audio PES encoder 107.

The audio PES encoder 107 packetizes the audio ES to produce a packetized elementary stream of the audio (hereinafter referred to as an audio PES), and applies the produced audio PES to the TS encoder 108. Note that the audio ES of one audio frame, for example, is stored in each audio PES.

Note that PSI (Program Specific Information), SI (service Information), data of data broadcast and so on, which are not illustrated, in addition to the video PES and the audio PES are applied in a form of sections to the TS encoder 108.

The TS encoder 108 packetizes and multiplexes each of the video PES, the audio PES and the foregoing signals in the form of sections, thereby producing a transport stream (hereinafter abbreviated as a TS), and then applies the produced TS to the modulator 109. Note that the TS encoder 108 manipulates data in the TS based on the flag signal applied from the analyzer 103. Details will be described later.

The modulator 109 modulates the TS applied from the TS encoder 108 in a predetermined modulation system (QAM (Quadrature Amplitude Modulation) system, for example). The transmitter 110 transmits the TS subjected to modulation processing by the modulator 109 as the TV broadcast signal.

(3-2) Processing of TS Encoder

In the present embodiment, the TS encoder 108 manipulates predetermined data of TS packets based on the flag signal (see FIG. 4 (*d*)) applied from the analyzer 103. The recording/reproducing apparatus 200 (FIG. 2) can sort the TS packets storing the data (the video PES and the audio PES) of the overlap scene and the other TS packets based on the manipulated data. This allows the overlap scene to be deleted in the time shift reproduction, as explained with reference to FIG. 2. The TS produced in the TS encoder 108 will now be described while referring to the drawings.

(a) Structure of the Transport Stream

FIG. 5 is a diagram showing the data structure of the TS packet.

The length of one TS packet is 188 bytes. As shown in FIG. 5, each TS packet includes a Header region of 4 bytes and a Data region of 184 bytes.

The Header region includes "sync_byte", "transport_error_indicator", "payload_unit_start_indicator", "transport_priority", "PID (packet identifier)", "transport_scrambleing_control", "adaptation_field_control" and "continuity_counter".

The Data region includes either or both of "adaptation_field" and "data_byte". Time information or the like is stored in "adaptation_field". Divided video PES, divided audio PES, divided data in the form of sections or the like is stored in "data_byte".

In the present embodiment, the TS encoder 108 manipulates data in "adaptation_field" based on the flag signal. Thus, "adaptation_field" exists in the TS packet storing the information of the overlap scene.

Note that when a value of "adaptation_field_control" is "10", the Data region of the TS packet is constituted only by "adaptation_field", and "data_byte" does not exist.

When the value of "adaptation_field_control" is "11", the Data region of the TS packet is constituted by "adaptation_field" and "data_byte".

When the value of "adaptation_field_control" is "01", the Data region of the TS packet is constituted only by "data_byte", and "adaptation_" does not exist.

Accordingly, "adaptation_field_control" is set to "10" or "11" by the TS encoder 108 in the TS packet storing the data of the overlap scene.

(b) Structure of "adaptation_field"

Next, the structure of "adaptation_field" is described.

FIG. 6 is a diagram showing the data structure of "adaptation_field".

As shown in FIG. 6, "adaptation_field" includes "adaptation_field_length", "discontinuity_indicator", "random_access_indicator", "elementary_stream_priority_indicator", "PCR_flag", "OPCR_flag", "splicing_point_flag", "transport_private_data_flag", "adaptation_field_extention_flag", "PCR (program_clock_reference) field", "OPCR (original_program_clock_reference) field", "splice_countdown field", "transport_private_data field", "adaptation_field_extention_field", and "stuffing_bytes".

The presence or absence of "PCR (program_clock_reference) field", "OPCR (original_program_clock_reference) field", "splice_countdown field", "transport_private_data field" and "adaptation_field_extention_field" is determined by "PCR flag", "OPCR flag", "splicing_point_flag", "transport_private_data_flag" and "adaptation_field_extention_flag".

The present embodiment employs "transport_private_field" as information for sorting the TS packets. Thus, "transport_private_data_flag" is always set to "1" in the present embodiment.

As shown in FIG. 6, "private_data_byte field" includes "transport_private_data_length" and "private_data_byte". "transport_private_data_length" contains eight bits, and assigns the number of bytes of "private_data_byte". In the present embodiment, the number of bytes of "private_data_byte" is set to 1 byte.

(c) Data Manipulation

In the present embodiment, the TS encoder 108 sets the value of "private_data_byte" to "0xFF" when the flag signal (FIG. 4 (d)) is at a high level while setting it to "0x00" when the flag signal is at a low level. That is, the value of "private_data_byte" of the TS packet storing the data of the overlap scene is "0xFF", and the value of "private_data_byte" of the other TS packet is "0x00".

Accordingly, the recorder/reproducer 204 (FIG. 7), described later, of the recording/reproducing apparatus 200 can sort the TS packets storing the data of the overlap scene and the other TS packets based on the value of "private_data_byte".

(4) The Recording/Reproducing Apparatus

Next, description is made of the recording/reproducing apparatus 200.

(4-1) Structure

Figure 7:
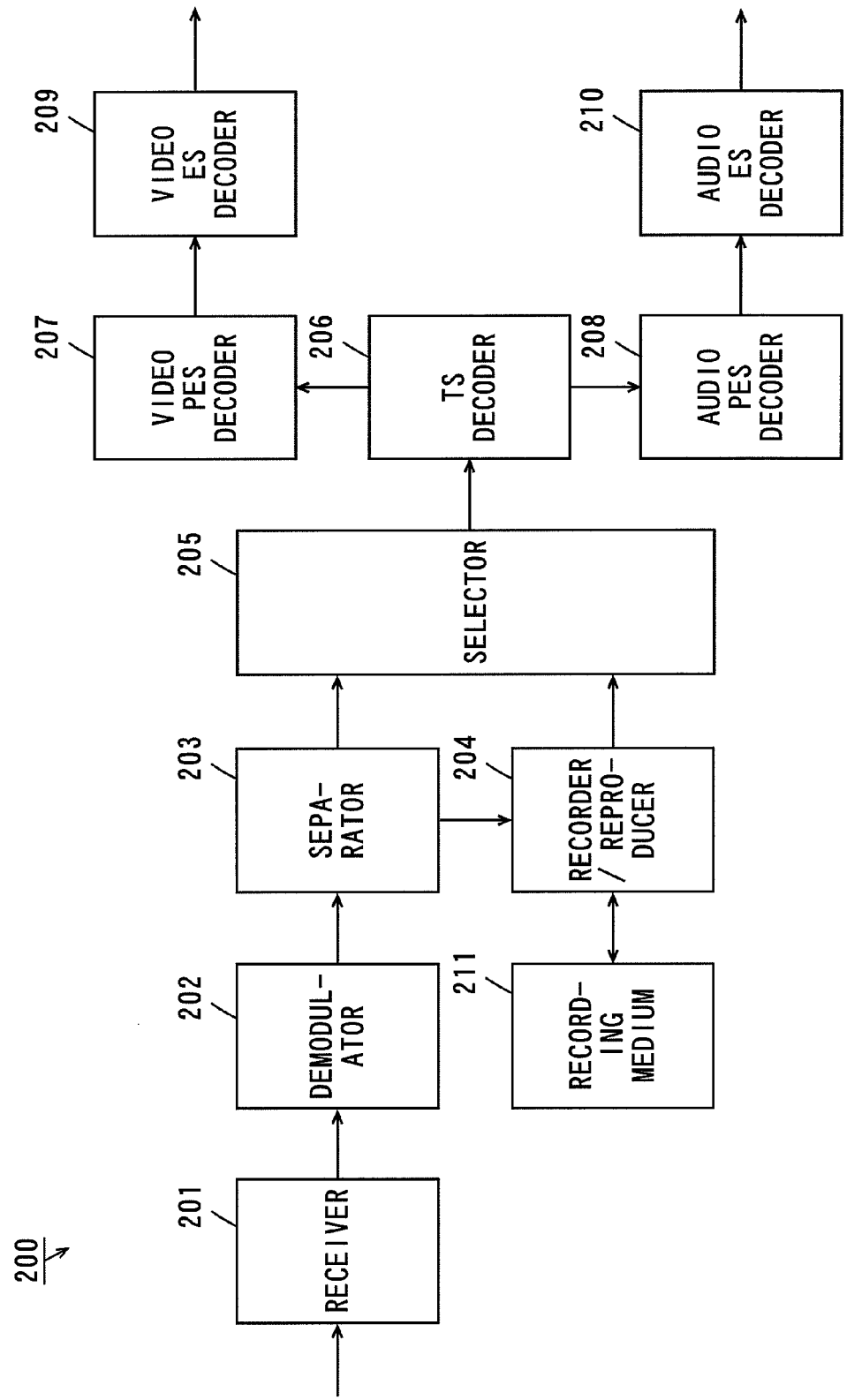
FIG. 7 is a block diagram showing the schematic structure of the recording/reproducing apparatus.

FIG. 7 is a block diagram showing the schematic structure of the recording/reproducing apparatus 200.

As shown in FIG. 7, the recording/reproducing apparatus 200 includes a receiver 201, a demodulator 202, a separator 203, the recorder/reproducer 204, a selector 205, a TS decoder 206, a video PES decoder 207, an audio PES decoder 208, a video ES decoder 209 and an audio ES decoder 210. The recorder/reproducer 204 is provided connectable to a recording medium 211.

The receiver 201 receives the TV broadcast signal transmitted from the broadcasting station apparatus 100 (FIG. 1), and applies the received TV broadcast signal to the demodulator 202. Specifically, a plurality of TV broadcast signals transmitted from a plurality of broadcasting station apparatuses 100 are input to the receiver 201. Then, the receiver 201 selects one TV broadcast signal from the plurality of TV broadcast signals, and applies the selected TV broadcast signal to the demodulator 202.

The demodulator 202 demodulates the TS from the TV broadcast signal, and applies the demodulated TS to the separator 203. The separator 203 classifies the TS packets in the TS by types (video, audio, data for data broadcasting and so on). The separator 203 applies the TS packets of audio, video and so on out of the classified TS packets to the recorder/reproducer 204 and the selector 205, and applies the TS packets of data for data broadcasting and so on to a CPU (Central Processing Unit) that is not shown.

The recorder/reproducer 204 writes and reads the TS packets in and from the recording medium 211 such as a DVD (Digital Versatile Disk), an HD (Hard Disk) or the like. Moreover, the recorder/reproducer 204 applies the TS packets read from the recording medium 211 to the selector 205. Details of the recorder/reproducer 204 will be described later.

The selector 205 selects either of the TS packets applied from the separator 203 and the TS packets applied from the recorder/reproducer 204, and applies the selected TS packets to the TS decoder 206.

Note that selection in the selector 205 is performed based on a viewer's operation of a controller (not shown). For example, when a viewer views the TV broadcast in real time, the selector 205 selects the TS packets applied from the separator 203. Meanwhile, when the viewer views the TV broadcast by the time shift reproduction, the selector 205 selects the TS packets applied from the recorder/reproducer 204.

The TS decoder 206 decodes the video PES and the audio PES from the TS packets, and applies the video PES to the video PES decoder 207 and the audio PES to the audio PES decoder 208.

The video PES decoder 207 decodes the video ES from the video PES, and applies the decoded video ES to the video ES decoder 209. The video ES decoder 209 decodes the video signal from the video ES, and applies the decoded video signal to the video output device 300 of FIG. 1. This causes video to be displayed on the video output device 300.

The audio PES decoder 208 decodes the audio ES from the audio PES, and applies the decoded audio ES to the audio ES decoder 210. The audio ES decoder 210 decodes the audio signal from the audio ES, and applies the decoded audio signal to the audio output device 400 of FIG. 1. This causes the audio to be output from the audio output device 400.

(4-2) The Recorder/Reproducer

As described above, the selector 205 applies the TS packets applied from the recorder/reproducer 204 to the TS decoder 206 in the time shift reproduction.

Here, the recorder/reproducer 204 sorts the TS packets read from the recording medium 211 into the TS packets not storing the data of the overlap scene and the TS packets storing the data of the overlap scene. Then, the recorder/reproducer 204 applies only the TS packets not storing the data of the overlap scene to the selector 205. That is, the TS packets storing the data of the overlap scene are discarded in the recorder/reproducer 204.

Accordingly, the TV broadcast signal (see FIG. 2 (b)) from which the overlap scene is deleted is applied to the video output device 300 (FIG. 1) and the audio output device 400 (FIG. 1) in the time shift reproduction. Accordingly, the viewer can view the TV broadcast from which the overlap scene is deleted.

FIG. 8 is a diagram showing Syntax of the TS packet, and FIG. 9 is a diagram showing Syntax of "adaptation_field" in the TS. The recorder/reproducer 204 reads the data according to the Syntax shown in FIGS. 8 and 9, and performs the above-described sorting. Hereinafter, brief description is made of the sorting processing of the TS packets performed by the recorder/reproducer 204 while referring to FIGS. 8 and 9.

FIG. 10 is a flowchart showing the sorting processing of the TS packets by the recorder/reproducer 204. First, the recorder/reproducer 204 reads the TS packets according to the Syntax shown in FIG. 8, and determines whether or not the value of "adaptation_field_control" (a portion indicated by a brace A in FIG. 8) of the TS packets is "10" or "11" (Step S1).

When the value of "adaptation_field_control" is set to "10" or "11", "adaptation_field" exists as indicated by the Syntax in a brace B of FIG. 8. Accordingly, the recorder/reproducer 204 reads "adaptation_field" according to the Syntax shown in FIG. 9, and determines whether or not the value of "private_data_byte" (a portion indicated by a brace C of FIG. 9) is "0xFF" (Step S2).

When the value of "private_data_byte" is "0xFF", the recorder/reproducer 204 determines that the TS packets store the data of the overlap scene, and discards the TS packets (Step S3).

When the value of "adaptation_field_control" is not "10" or "11"; that is, when the value of "adaptation_field_control" is "01" in Step S1, the "adaptation_field" does not exist. Accordingly, the recorder/reproducer 204 determines that the TS packets do not store the data of the overlap scene, and applies the TS packets to the selector 205 (Step S4).

When the value of "private_data_byte" is not "0xFF"; that is, when the value of "private_data_byte" is "0x00" in Step S2, the recorder/reproducer 204 determines that the TS packets do not store the data of the overlap scene, thus proceeding to Step S4 and applying the TS packets to the selector 205.

(5) Effects of the First Embodiment

As described above, the value of "private_data_byte" of the TS packets storing the data of the overlap scene is set to "0xFF" by the TS encoder 108 of the broadcasting station apparatus 100 in the transmitting/receiving system 1000 according to the present embodiment.

The recorder/reproducer 204 of the recording/reproducing apparatus 200 sorts the TS packets recorded in the recording medium 211 into the TS packets storing the data of the overlap scene and the TS packets not storing the data of the overlap scene based on the value of "private_data_byte". Then, the recorder/reproducer 204 applies only the TS packets not storing the data of the overlap scene to the selector 205.

In this case, the TV broadcast signal from which the data of the overlap scene is deleted is applied to the video output device 300 and the audio output device 400. Thus, in the time shift reproduction; the viewer can view the TV broadcast from which the overlap scene is deleted. This allows the viewer to comfortably view the TV broadcast. Also, time for viewing the TV broadcast can be shortened.

In addition, the value of "private_data_byte" of the TS packets is manipulated, thereby allowing the sorting of the TS packets in the present embodiment. That is, the sorting of the TS packets can be performed without decoding the PES or the ES in the recording/reproducing apparatus 200. Accordingly, the overlap scene can be easily deleted in the time shift reproduction.

Furthermore, the GOP is completed at the ending point of the CM before the overlap scene and the ending point of the overlap scene in the present embodiment. This prevents degradation of the video of the CM immediately before the overlap scene and the video of the TV program immediately after the overlap scene at the time of deletion of the overlap scene from the TV broadcast signal.

(6) Other Examples (6-1) Another Example of the Value of "private_data_byte"

While the value of "private_data_byte" is set to "0xFF" and "0x00" in the foregoing embodiment, the value of "private_data_byte" may be set to other values such as "0x88".

For example, when a scene produced by briefly editing the scene before the CM (hereinafter referred to as an edit scene) is arranged after the CM, the value of "private_data_byte" of the TS packets storing data of the edit scene may be set to "0x88". The recording/reproducing apparatus 200 may be provided with a structure with which the viewer can select whether or not to delete the TS packets having the value of "private_data_byte" of "0x88".

While the value of "private_data_byte" of the TS packets storing the data of the overlap scene is "0xFF" in the foregoing embodiment, the value of "private_data_byte" may be set to "0x00" or "0x88" for the overlap scene that broadcasting stations do not desire the viewer to delete.

As described above, the value of "private_data_byte" is manipulated according to intention of broadcasting stations, so that the TV broadcast as intended by the broadcasting stations can be provided to the viewer even in the time shift reproduction. In addition, the viewer can selectively delete the overlap scene and the edit scene, thus more comfortably viewing the TV broadcast.

(6-2) Another Example of "transport_private_data_flag"

While "transport_private_data_flag" (see FIG. 6) is always set to 1 in the foregoing embodiment, "transport_private_data_flag" may be set to "0". For example, "transport_private_data_flag" of the TS packets storing the data of the overlap scene may be set to "1", and "transport_private_data_flag" of the other TS packets may be set to "0".

In this case, the recorder/reproducer 204 (FIG. 7) can sort the TS packets based on "transport_private_data_flag". This allows the overlap scene to be more easily deleted in the time shift reproduction.

(6-3) Example Using "transport_priority"

While the example using "adaptation_field" is described in the foregoing embodiment, the TS packets may be sorted using "transport_priority". For example, "transport_priority" of the TS packets storing the data of the overlap scene may be set to "1", and "transport_priority" of the other TS packets may be set to "0".

In this case, the recorder/reproducer 204 (FIG. 7) can sort the TS packets based on "transport_priority". That is, the recorder/reproducer 204 does not read the Data region (FIG. 5) of each TS packet but reads only the Header region (FIG. 5), thereby sorting the TS packets. This allows the overlap scene to be more easily deleted in the time shift reproduction.

(6-4) Another Example of the Recorder/Reproducer

While the recorder/reproducer 204 (FIG. 7) sorts the TS packets at the time of reading the TS packets from the recording medium 211 in the foregoing embodiment, the recorder/reproducer 204 may sort the TS packets at the time of writing the TS packets in the recording medium 211. In this case, only the TS packets not storing the data of the overlap scene can be recorded in the recording medium 211. This decreases a used area of the recording medium 211.

(6-5) Example Using Data in the PES

While the overlap scene is deleted using the data in the TS packets in the foregoing embodiment, the overlap scene may be deleted using "PES_priority", "PES_private_data" or the like in the PES packets.

Note that in this case, the flag signal produced in the analyzer 103 is applied to the video PES encoder 106 and the audio PES encoder 107. Then, "PES_priority" or "PES_private_data" of the PES packets in which the data of the overlap scene is stored is manipulated in the video PES encoder 106 and the audio PES encoder 107.

In this case, the recorder/reproducer 204 does not sort the TS packets, and the video PES decoder 207 (FIG. 7) and the audio PES decoder 208 (FIG. 7) sort the PES packets based on "PES_priority", "PES_private_data" or the like.

(B) Second Embodiment (1) Structure of the Transmitting/Receiving System

A transmitting/receiving system according to a second embodiment is different from the transmitting/receiving system 1000 of FIG. 1 in the following points.

Figure 11:
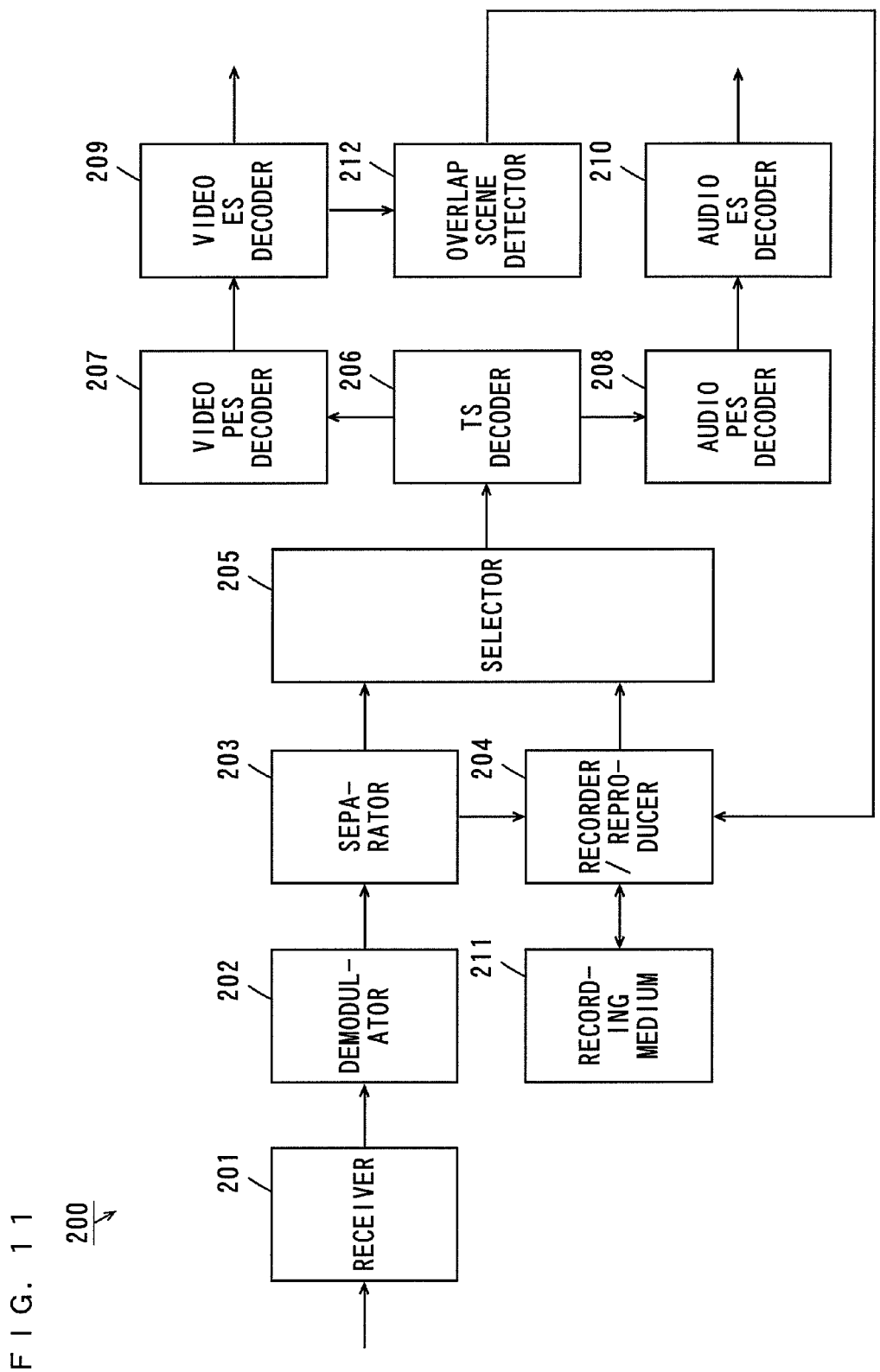
FIG. 11 is a block diagram showing the schematic structure of a recording/reproducing apparatus according to a second embodiment.

FIG. 11 is a block diagram showing the schematic structure of the recording/reproducing apparatus 200 according to the second embodiment. As shown in FIG. 11, the recording/reproducing apparatus 200 according to the present embodiment further includes an overlap scene detector 212. Note that the recorder/reproducer 204 has a function of reading the data of the TS packets and the PES packets in the present embodiment.

The data manipulation, which is described in the first embodiment, for the TS is not performed in the present embodiment. Thus, a normal TS is input to the receiver 201. The recorder/reproducer 204 performs processing that is different from the sorting processing described in the first embodiment.

(2) Processing of the Recording/Reproducing Apparatus

Hereinafter, description is made of the processing performed in the recording/reproducing apparatus 200. Note that the processing described in the following is performed at the time of record of the TV broadcast signal.

The recorder/reproducer 204 records the TS packets applied from the separator 203 in the recording medium 211 while applying the TS packets to the selector 205. Note that at this time, "transport_priority" (see FIG. 5) of the TS packets is set to "0" by the recorder/reproducer 204 to be recorded in the recording medium 211.

The TS packets applied from the recorder/reproducer 204 to the selector 205 are applied to the video ES decoder 209 as the video ES through the TS decoder 206 and the video PES decoder 207.

The video ES decoder 209 decodes the video signal from the video ES, and applies the decoded video signal to the overlap scene detector 212. The video ES decoder 209 applies information representing a relationship between PTS (Presentation Time Stamp) extracted from the PES packets by the video PES decoder 207 and each frame produced by the video signal to the overlap scene detector 212.

The overlap scene detector 212 produces a plurality of frames based on the video signal, and detects the overlap scene based on the plurality of frames.

A method of detecting the overlap scene in the overlap scene detector 212 is to store frames of one minute (1800 frames) that are produced based on the video signal in each of internal five storages (hereinafter referred to as first to fifth storages), for example. Then, data of the frames in each storage is compared with data of the frames in other four storages. When same frame groups exist in different storages, the overlap scene detector 212 detects the frame group whose display time is late as the overlap scene.

For example, when the data of the frames from the twelve hundredth to the eighteen hundredth of the frames of one minute stored in the second storage and the data of the frames from the hundredth to the seven hundredth of the frames of one minute stored in the fifth storage are equal, respectively, the overlap scene detector 212 detects the frame group from the hundredth to the seven hundredth in the fifth storage as the overlap scene. Note that in comparison of the frames, differences of the frame data are detected, so that determination as to whether or not the frames are the same can be made, for example.

When the overlap scene is detected, the overlap scene detector 212 applies the PTSs corresponding to the plurality of frames, respectively, constituting the overlap scene to the recorder/reproducer 204. When the PTSs are applied from the overlap scene detector 212, the recorder/reproducer 204 again reads the TS packets recorded in the recording medium. The recorder/reproducer 204 changes "transport_priority" (see FIG. 5) of the TS packets in which the data of the PES packet storing the applied PTSs is stored to "1", and subsequently writes all the TS packets again in the recording medium 211.

In the time shift reproduction, the recorder/reproducer 204 applies to the selector 205 only the TS packets whose "transport_priority" is set to "1" out of the TS packets read from the recording medium 211. Accordingly, in the time shift reproduction, the viewer can view the TV broadcast from which the overlap scene is deleted.

(3) Effects of the Second Embodiment

In the present embodiment, the overlap scene is detected by the overlap scene detector 212. When the overlap scene is detected, "transport_priority" of the TS packets storing the data of the overlap scene out of the TS packets recorded in the recording medium 211 is changed to "1" by the recorder/reproducer 204.

Then, in the time shift reproduction, the recorder/reproducer 204 applies only the TS packets not storing the data of the overlap scene to the selector 205 based on "transport_priority".

In this case, the TV broadcast signal from which the data of the overlap scene is deleted is applied to the video output device 300 and the audio output device 400. Accordingly, in the time shift reproduction, the viewer can view the TV broadcast from which the overlap scene is deleted. This allows the viewer to comfortably view the TV broadcast. Also, time for viewing the TV broadcast can be shortened.

Since the overlap scene is detected in the overlap scene detector 212, special processing for recognizing the overlap scene need not be performed to the TS in the broadcasting stations in the present embodiment. This does not increase operational cost of the broadcasting stations.

While description is made of the example in which the foregoing processing is performed at the time of record of the TV broadcast signal in the present embodiment, the foregoing processing may be performed when the recording/reproducing apparatus 200 is not used, for example, in the middle of the night.

In this case, the recorder/reproducer 204 does not apply the TS packets to the selector 205 when recording the TS packets applied from the separator 203 in the recording medium 211. The recorder/reproducer 204 reads the TS packets from the recording medium 211 and applies the TS packets to the selector 205 at a predetermined time in the middle of the night, for example. Then, the above-described processing is performed in the overlap scene detector 212 and the recorder/reproducer 204. Accordingly, the viewer can view the TV broadcast from which the overlap scene is deleted.

(4) Other Examples (4-1) Another Example of Detection Timing of the Overlap Scene While description is made of the case where detection of the overlap scene is performed at the time of record of the TV broadcast signal in the recording medium 211 in the foregoing embodiment, detection of the overlap scene may be performed when the recording/reproducing apparatus 200 (FIG. 11) is not used in the middle of the night, for example.

In this case, the recorder/reproducer 204 (FIG. 11) does not apply the TS packets to the selector 205 when recording the TS packets applied from the separator 203 in the recording medium 211. The recorder/reproducer 204 reads the TS packets from the recording medium 211 and then applies the TS packets to the selector 205 at a predetermined time in the middle of the night, for example. Then, the above-described processing is performed in the overlap scene detector 212 and the recorder/reproducer 204. Accordingly, the viewer can view the TV broadcast from which the overlap scene is deleted.

(4-2) Another Example of the Recorder/Reproducer

While the recorder/reproducer 204 changes "transport_priority" of the TS packets storing the data of the overlap scene to "1" and again records the TS packets in the recording medium 211 when the overlap scene is detected in the foregoing embodiment, the TS packets storing the data of the overlap scene may be discarded. In this case, a used area of the recording medium 211 can be decreased.

(C) Correspondences Between Elements in the Claims and Parts in Embodiments

In the following paragraphs, non-limiting examples of correspondences between various elements recited in the claims below and those described above with respect to various preferred embodiments of the present invention are explained.

In the foregoing embodiments, the video editor 101 and the audio editor 102 are examples of an editor, the video ES encoder 104 and the audio ES encoder 105 are examples of an encoder, the video PES encoder 106, the audio PES encoder 107 and the TS encoder 108 are examples of a packet producer, the video PES encoder 106 and the audio PES encoder 107, or the TS encoder 108 is an example of a first data manipulator, the recorder/reproducer 204 is an example of a writer and a reader, the TS decoder 206, the video PES decoder 207 and the audio PES decoder 208 are examples of a first decoder, the recorder/reproducer 204, or the video PES decoder 207 and the audio PES decoder 208 are examples of a first sorter, the TS decoder 206 is an example of a second decoder, the video PES decoder 207 and the audio PES decoder 208 are examples of a third decoder, the video PES decoder 207 and the audio PES decoder 208 are examples of a second sorter, the video ES decoder 209 is an example of a fourth decoder, the overlap scene detector 212 and the recorder/reproducer 204 are examples of a second data manipulator, and the audio ES decoder 210 is an example of a fifth decoder.

As each of various elements recited in the claims, various other elements having configurations or functions described in the claims can be also used.

INDUSTRIAL APPLICABILITY

The present invention is applicable to an apparatus of a broadcasting station that produces TV broadcast signals, a recording/reproducing apparatus such as a television receiver that receives TV broadcast signals, and a recording/reproducing apparatus that performs recording and reproducing of recording media such as a DVD and a hard disk.

The invention claimed is:

1. A broadcasting station apparatus that produces a television broadcast signal, comprising:
   an editor configured to edit information of a television program and information of a commercial message to produce an edit signal for television broadcasting to which time codes indicating each period of the television program and a switching point of the commercial message is given;
   an analyzer configured to externally receive, as an input indicating that information in a given period of the television program after information of the commercial message is substantially the same as information in a period of the television program before the information of the commercial message, a first time code of the edit signal corresponding to a starting point of said given period and a second time code of the edit signal corresponding to an ending point of said given period, and generate a flag signal specifying said given period when receiving the first and second time codes;
   an encoder configured to encode the edit signal produced by said editor to produce an encoded signal;
   a packet producer configured to packetize the encoded signal produced by said encoder; and
   a data manipulator configured such that predetermined data in a packet storing the information in said given period of the television information specified by the flag signal out of packets produced by said packet producer is described in a first content, and the predetermined data in a packet storing information in another period of the television information is described in a second content that is different from the first content when the flag signal is produced by said analyzer.

2. The broadcasting station apparatus according to claim 1, wherein
   said information of the television program includes video information of the television program, said information of the commercial message includes video information of the commercial message, said edit signal includes a video signal in which the video information of the television program and the video information of the commercial message are edited,
   said encoder includes an elementary stream producer configured to produce an elementary stream of the video signal, and
   said elementary stream producer is configured to complete GOP at an ending point of said commercial message and an ending point of said given period.

3. The broadcasting station apparatus according to claim 1, wherein said packet producer includes a transport stream packet producer that produces configured to produce a transport stream packet, and said predetermined data is "private_data_byte".

4. The broadcasting station apparatus according to claim 3, wherein a value of said "private_data_byte" is determined depending on a level of importance of a scene of said given period after the commercial message.

5. The broadcasting station apparatus according to claim 1, wherein said packet producer configured to produce a transport stream packet producer that produces a transport stream packet, and said predetermined data is "transport_private_data_flag".

6. The broadcasting station apparatus according to claim 1, wherein said packet producer configured to produces a transport stream packet producer that produces a transport stream packet, and said predetermined data is "transport_priority".

7. The broadcasting station apparatus according to claim 1, wherein said packet producer configured to produce a packetized elementary stream producer that produces a packetized elementary stream, and said predetermined data is "PES_priority".

8. The broadcasting station apparatus according to claim 1, wherein said packet producer configured to produce a packetized elementary stream producer that produces a packetized elementary stream, and said predetermined data is "PES_private_data".

9. A recording/reproducing apparatus that records and reproduces a television broadcast signal produced by a broadcasting station apparatus, said television broadcast signal being configured such that when information in a given period of a television program after information of a commercial message is substantially the same as information in a period of the television program before the information of the commercial message, predetermined data in a packet storing the information in said given period of the television program is described in a first content, and the predetermined data in a packet storing information in another period of the television program is described in a second content that is different from the first content, said recording/reproducing apparatus comprising:

a writer configured to write the television broadcast signal produced by said broadcasting station apparatus in a form of packets in a recording medium;

a reader configured to reads the packets recorded in the recording medium;

a first sorter configured to sort the packets read from the recording medium by said reader or the packets written in the recording medium by said writer into a packet including the predetermined data of the first content and a packet including the predetermined data of the second content; and a first decoder configured to decode an encoded signal from the packet including the predetermined data of the second content sorted by said first sorter out of the packets read by said reader and not to decode an encoded signal from the packet including the predetermined data of the first content sorted by said first sorter.

10. The recording/reproducing apparatus according to claim 9, wherein said writer is configured to write the television broadcast signal produced by said broadcasting station apparatus in a form of transport stream packets in the recording medium, said reader is configured to read the transport stream packets recorded in the recording medium, said first sorter is configured to sort the transport stream packets read from the recording medium by said reader or the transport stream packet written in the recording medium by said writer into a transport stream packet including the predetermined data of the first content and a transport stream packet including the predetermined data of the second content, and said first decoder is configured to decode said encoded signal from the transport stream packet including the predetermined data of the second content sorted by said first sorter out of the transport stream packets read by said reader and not to decode said encoded signal from the transport stream packet including the predetermined data of the first content sorted by said first sorter.

11. The recording/reproducing apparatus according to claim 9, wherein said reader is configured to discard the packet including the predetermined data of the first content sorted by said first sorter.

12. The recording/reproducing apparatus according to claim 9, wherein said writer is configured to write the packet storing including the predetermined data of the first content sorted by said first sorter into the recoding medium.

13. A recording/reproducing apparatus that records and reproduces a television broadcast signal produced by a broadcasting station apparatus, said television broadcast signal being configured such that when information in a given period of a television program after information of a commercial message is substantially the same as information in a period of the television program before the information of the commercial message, predetermined data in a packetized elementary stream packet storing the information in said given period of the television program is described in a first content, and the predetermined data in a packetized elementary stream packet storing information in another period of the television program is described in a second content that is different from the first content, said recording/reproducing apparatus comprising:

a writer configured to write the television broadcast signal produced by said broadcasting station apparatus in a form of transport stream packets in a recording medium;

a reader configured to read the transport stream packets recorded in the recording medium;

a second decoder configured to decode packetized elementary stream packets from the transport stream packets read by said reader;

a third decoder configured to decode an elementary stream from the packetized elementary stream packets decoded by said second decoder; and a second sorter configured to sort the packetized elementary stream packets decoded by said second decoder into a packetized elementary stream including the predetermined data of the first content and a packetized elementary stream packet including the predetermined data of the second content, wherein said third decoder is configured to discard the packetized elementary stream packet including the predetermined data of the second content sorted by said second sorter.

* * * * *